United States Patent
Sayed Hassan et al.

(10) Patent No.: US 12,500,630 B2
(45) Date of Patent: Dec. 16, 2025

(54) TPMI SELECTION BASED ON BEAMFORMING CATEGORY

(71) Applicant: QUALCOMM Incorporated, San Diego, CA (US)

(72) Inventors: Mohamad Sayed Hassan, Paris (FR); Andrei Dragos Radulescu, La Jolla, CA (US); Rajat Prakash, San Diego, CA (US); Lisi Jiang, San Diego, CA (US); Abhishek Saurabh Sachidanand Sinha, San Diego, CA (US); Michael Francis Garyantes, Bradley Beach, NJ (US)

(*) Notice: Subject to any disclaimer, the term of this patent is extended or adjusted under 35 U.S.C. 154(b) by 379 days.

(21) Appl. No.: 18/174,385

(22) Filed: Feb. 24, 2023

(65) Prior Publication Data

US 2023/0283328 A1  Sep. 7, 2023

Related U.S. Application Data

(60) Provisional application No. 63/315,422, filed on Mar. 1, 2022.

(51) Int. Cl.
*H04B 7/04* (2017.01)
*H04B 7/0456* (2017.01)
*H04L 25/02* (2006.01)

(52) U.S. Cl.
CPC ....... *H04B 7/0456* (2013.01); *H04L 25/0224* (2013.01)

(58) Field of Classification Search
CPC .. H04B 7/0617; H04B 7/0456; H04B 7/0857; H04L 25/0224
See application file for complete search history.

(56) References Cited

U.S. PATENT DOCUMENTS

2019/0335475 A1* 10/2019 Liang .................. H04W 72/541
2020/0119786 A1*  4/2020 Tan ...................... H04B 7/0634

FOREIGN PATENT DOCUMENTS

WO    WO-2019045606 A1 *  3/2019  ......... H04B 7/06956

* cited by examiner

*Primary Examiner* — Shukri Taha

(57) ABSTRACT

Certain aspects of the present disclosure provide a method for wireless communication by a first network entity. The method generally includes generating beam forming weights (BFWs) based on channel estimates (CEs) based on precoded demodulation reference signals (DMRS), performing a reversion procedure, on the BFWs, based on precoding applied at a user equipment (UE) when transmitting the precoded DMRS, and transmitting, on a fronthaul (FH), a signal to a second network entity with beamforming using the BFWs.

20 Claims, 15 Drawing Sheets

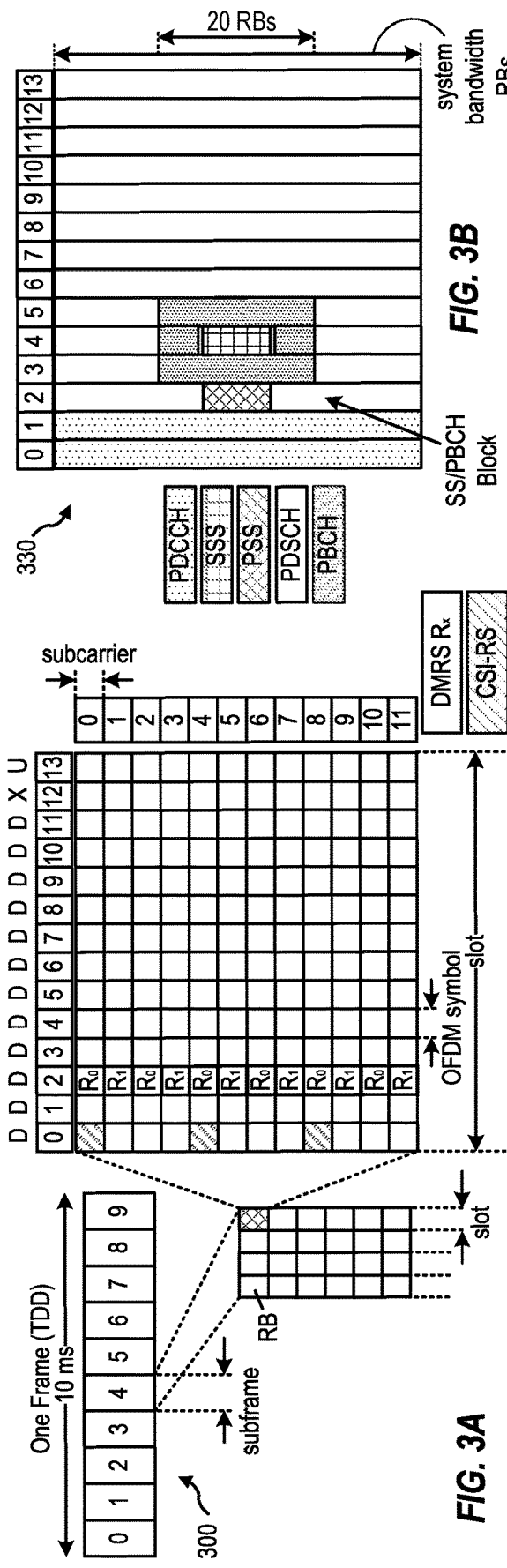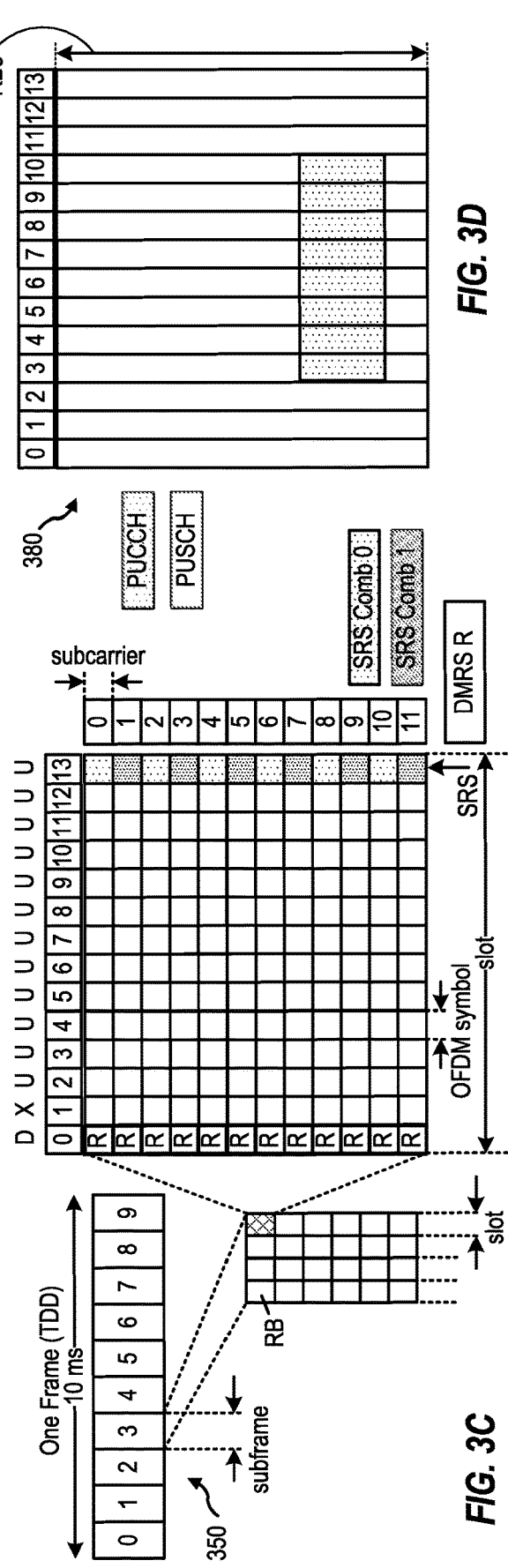

TPMI SELECTION BASED ON BEAMFORMING CATEGORY

RELATED APPLICATIONS

This application claims benefit of and priority to U.S. Provisional Application No. 63/315,422, filed Mar. 1, 2022, which are assigned to the assignee hereof and hereby expressly incorporated by reference in their entireties as if fully set forth below and for all practical purposes.

INTRODUCTION

Aspects of the present disclosure apparatuses, methods, processing systems, and computer-readable mediums relate to wireless communications, and more particularly, to techniques that may help enhance transmit precoding matrix index (TPMI) selection at a network entity.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a first network entity (NE), comprising: generating beam forming weights (BFWs) based on channel estimates (CEs) based on precoded demodulation reference signals (DMRS); performing a reversion procedure, on the BFWs, based on precoding applied at a user equipment (UE) when transmitting the precoded DMRS; and transmitting, on a fronthaul (FH), a signal to a second network entity with beamforming using the BFWs.

One aspect provides a method for wireless communications by a second network entity, comprising: receiving, from a first network entity, at least one of an indication of a first capability of the first network entity to generate beam forming weights (BFWs) based on precoded demodulation reference signals (DMRS)-based channel estimates (CEs); or an indication of a second capability of the first network entity to perform a reversion procedure, on the BFWs, based on precoding applied at a user equipment (UE) when transmitting the precoded DMRS; and performing a transmitted precoding matrix indicator (TPMI) selection procedure based on at least one of the indication of the first capability of the first network entity or the indication of the second capability of the first network entity.

One aspect provides a method for wireless communications by a first network entity, comprising: generating beam forming weights (BFWs) based on channel estimates (CEs) based on reference signals (RSs); and transmitting, to a second network entity, in-phase (I) and quadrature (Q) streams using the BFWs; and a representation of the channel observations based on the RSs.

One aspect provides a method for wireless communications by a second network entity, comprising: receiving, from a first network entity, in-phase (I) and quadrature (Q) streams using beam forming weights (BFWs); and receiving, from a first network entity, a representation of the channel observations based on the RSs.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
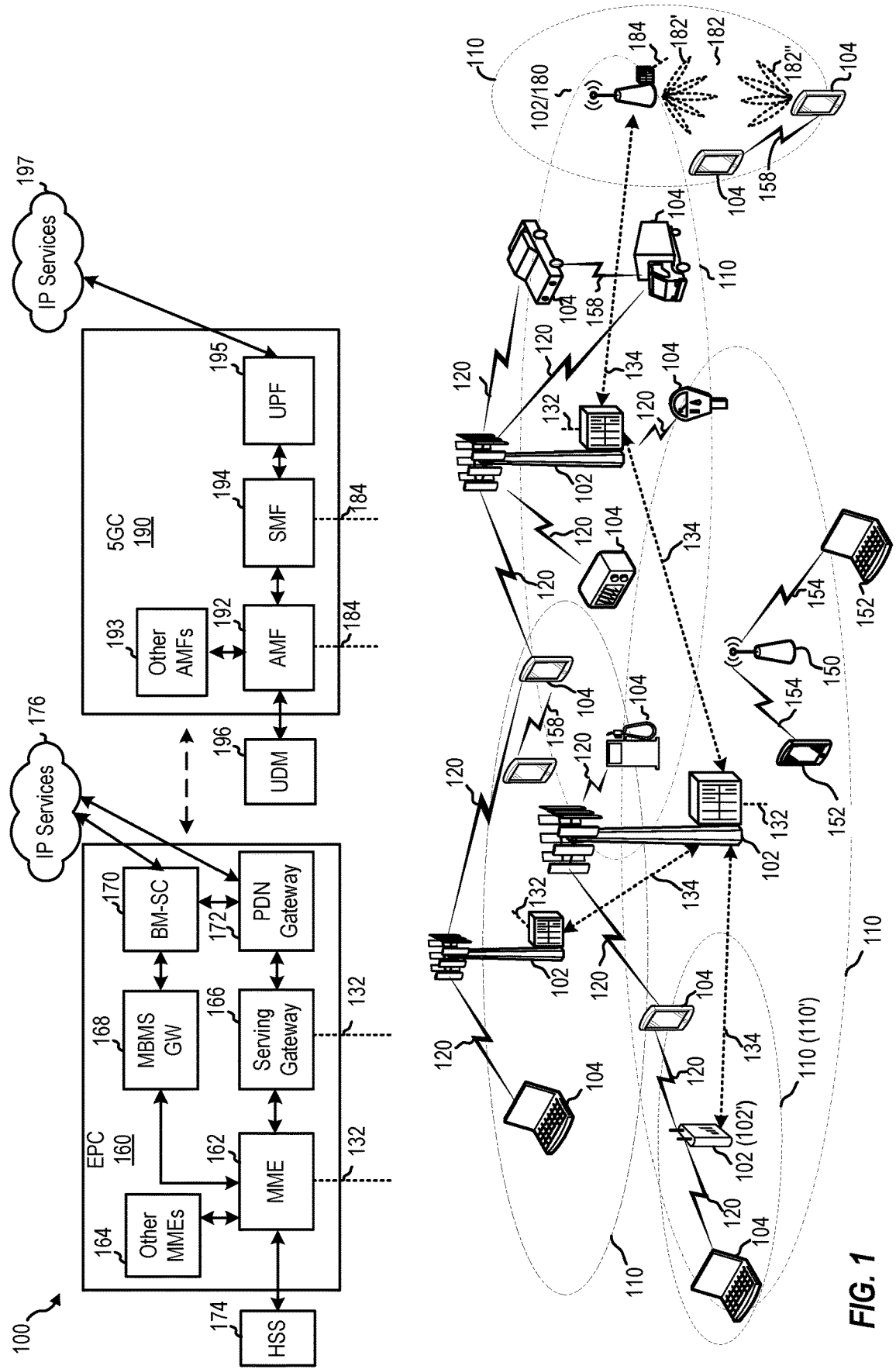
FIG. 1 is a block diagram conceptually illustrating an example wireless communication network.

Aspects of the present disclosure provide apparatuses, methods, processing systems, and computer-readable mediums for techniques that may help enhance transmit precoding matrix index (TPMI) selection. For example, the techniques may account for precoding applied at a UE.

Deployment of communication systems, such as 5G new radio (NR) systems, may be arranged in multiple manners with various components or constituent parts. In such systems, a network entity, such as a base station (BS), or one or more units (or one or more components) performing base station functionality, may be implemented in a disaggregated architecture. For example, a disaggregated base station may be configured to utilize a protocol stack that is physically or logically distributed among two or more units (such as one or more central or centralized units (CUs), one or more distributed units (DUs), or one or more radio units (RUs)).

In some cases, disaggregated base stations may be utilized in an open radio access network (O-RAN (such as the network configuration sponsored by the O-RAN Alliance)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

O-RAN specifies control plane, user plane and synchronization plane protocols used over the fronthaul interface linking the O-DU (O-RAN Distributed Unit) with the O-RU (O-RAN Radio Unit) with a Lower Layer Functional Split (e.g., Functional Split −7-2x) based architecture. As used herein, the term functional split generally refers to how (e.g., gNB) functionality is divided between network entities (O-DUs and O-RUs).

One potential area of interest is the impact of uplink performance for various Lower Layer Split functional division between O-DU and O-RU, particularly for physical uplink shared channel (PUSCH) transmissions in systems involving many antennas, such as massive multiple input-multiple output (MIMO) use cases. Conventionally, beamforming weights for uplink transmissions are based on sounding reference signal (SRS) channel estimates. At the O-DU, on the other hand, channel estimation based on demodulation reference signals (DMRS) is applied for demodulation.

Further, at the O-DU, for codebook-based uplink transmissions, where the gNB indicates a Transmitted Precoding Matrix Indication (TPMI) to a UE, a TPMI selection component is typically implemented at the O-DU. Ideally, such a selection component would allow TPMI selection based on DMRS-based channel estimates and/or SRS-based channel estimates to determine the best TPMI to be used (by the UE) for next UL scheduled transmission. The TPMI selection can be based on aperiodic SRS transmitted with scheduled PUSCH or based on DMRS.

One potential challenge arises because TPMI is typically applied (by the UE) to precode DMRS pilots. Thus, a gNB receiver (whether this functionality is at the O-DU or O-RU) may need to assume that DMRS pilots are precoded by TPMI. SRS, on the other hand, is typically transmitted from the UE without any precoding (e.g., for codebook based uplink). Thus, when TPMI is computed based on DMRS (DMRS-based channel estimation), the effects of this precoding may need to be accounted for, by a process referred to as reversion, in effect removing the precoding from the channel estimates.

Beamforming weights (BFWs) are used to optimize fronthaul (FH) transmissions from the O-RU to the O-DU. If the BFWs are derived from SRS channel estimates, the beamformer (combiner, or port reduction matrix) does not need to take the TPMI into account (as SRS is sent without precoding). If BFWs are derived based on DMRS channel estimates, however, it may not be clear how the O-DU can determine it should perform the precoding reversion operation, when performing TPMI selection. In other words, if the O-RU is performing beamforming based on DMRS, without considering effects that DMRS is already precoded, it may be difficult for the O-DU to know whether signals coming from the O-RU should be reverted (based on the TPMI applied by UE) or if this was already accounted for in the beamforming process. This may lead to less than optimal TPMI selection, for example, if the O-DU should have performed the reversion procedure but does not (or if the O-DU performs the reversion procedure when this was handled at the O-RU).

Aspects of the present disclosure help address this scenario. For example, according to certain aspects, an O-RU may signal (to an O-DU) its capability to generate BFWs based on DMRS-based CEs, as well as its capability to perform the reversion procedure. In such cases, the O-DU may signal the O-RU when it is (or is not) to perform the reversion procedure. Based on this signaling, the O-DU may know, when BFWs are derived based on DMRS channel estimates, when it should perform the precoding reversion operation, when performing TPMI selection.

As a result, aspects of the present disclosure may lead to improved TPMI selection, which may result in improved overall performance.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 2:
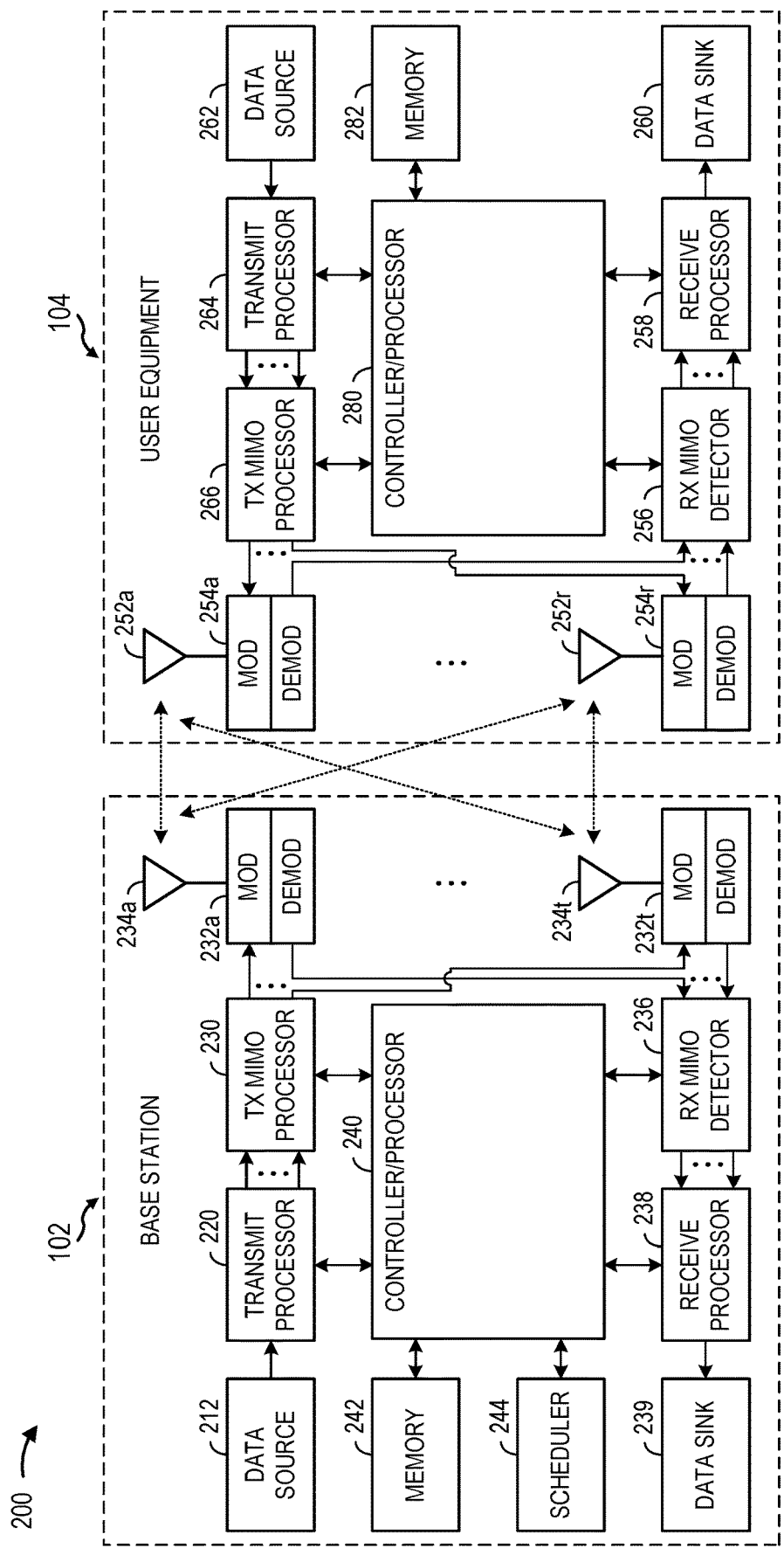
FIG. 2 is a block diagram conceptually illustrating aspects of an example of a base station and user equipment.

FIG. 2 depicts aspects of an example system 200, including base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Overview of Disaggregated Network Entity

Figure 4:
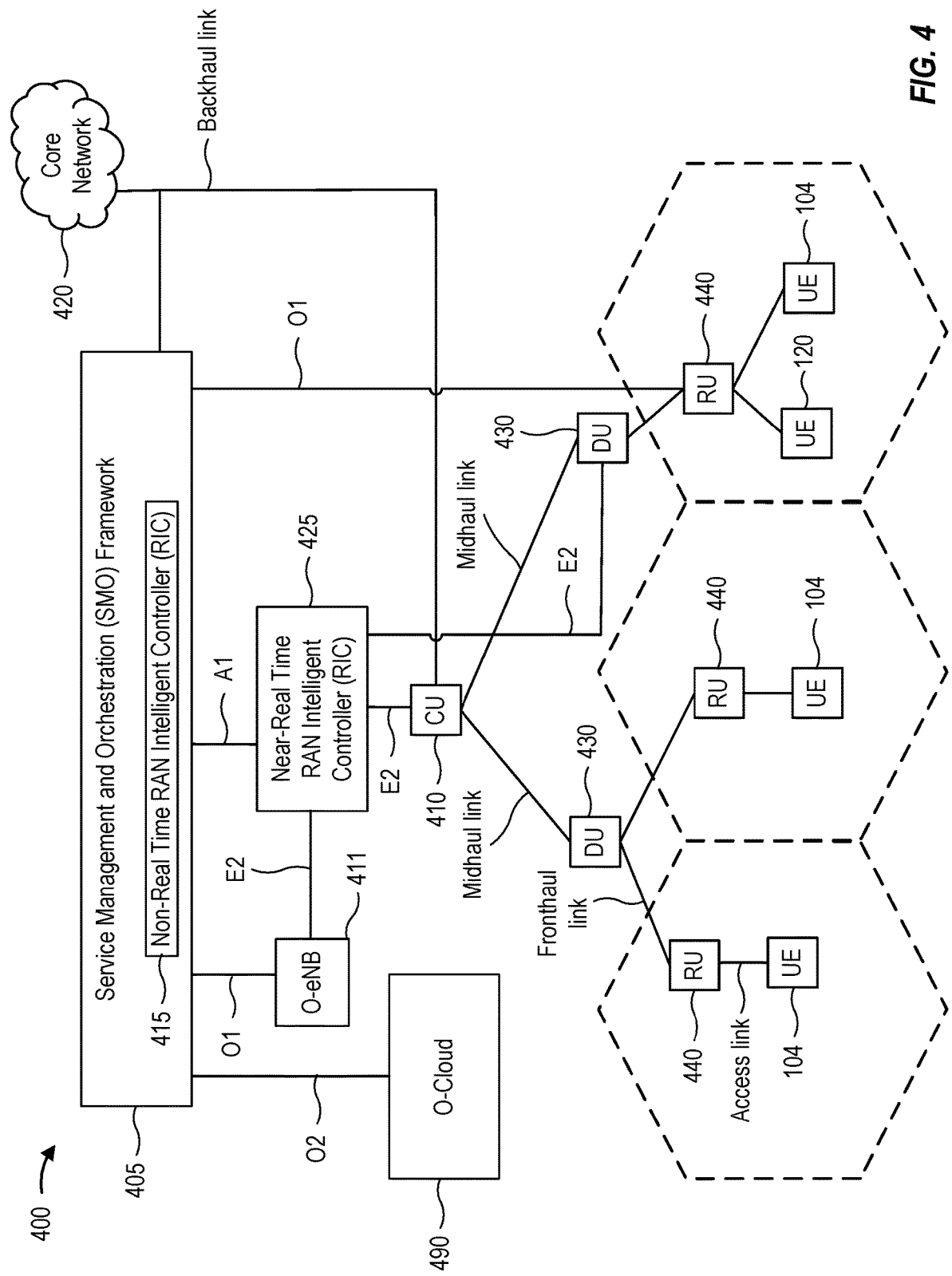
FIG. 4 depicts an example disaggregated base station architecture.

FIG. 4 depicts an example disaggregated base station 400 architecture, in which aspects of the present disclosure may be practiced. For example, various operations described herein may be implemented at DUs and RUs.

The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit—User Plane (CU-UP)), control plane functionality (i.e., Central Unit—Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Example SRS Based Transmissions

Some deployments (e.g., NR Release 15 and 16 systems) support codebook-based transmission and non-codebook-based transmission schemes for uplink transmissions with wideband precoders. Codebook-based UL transmission is based on BS configuration and can be used in cases where reciprocity may not hold.

Figure 5:
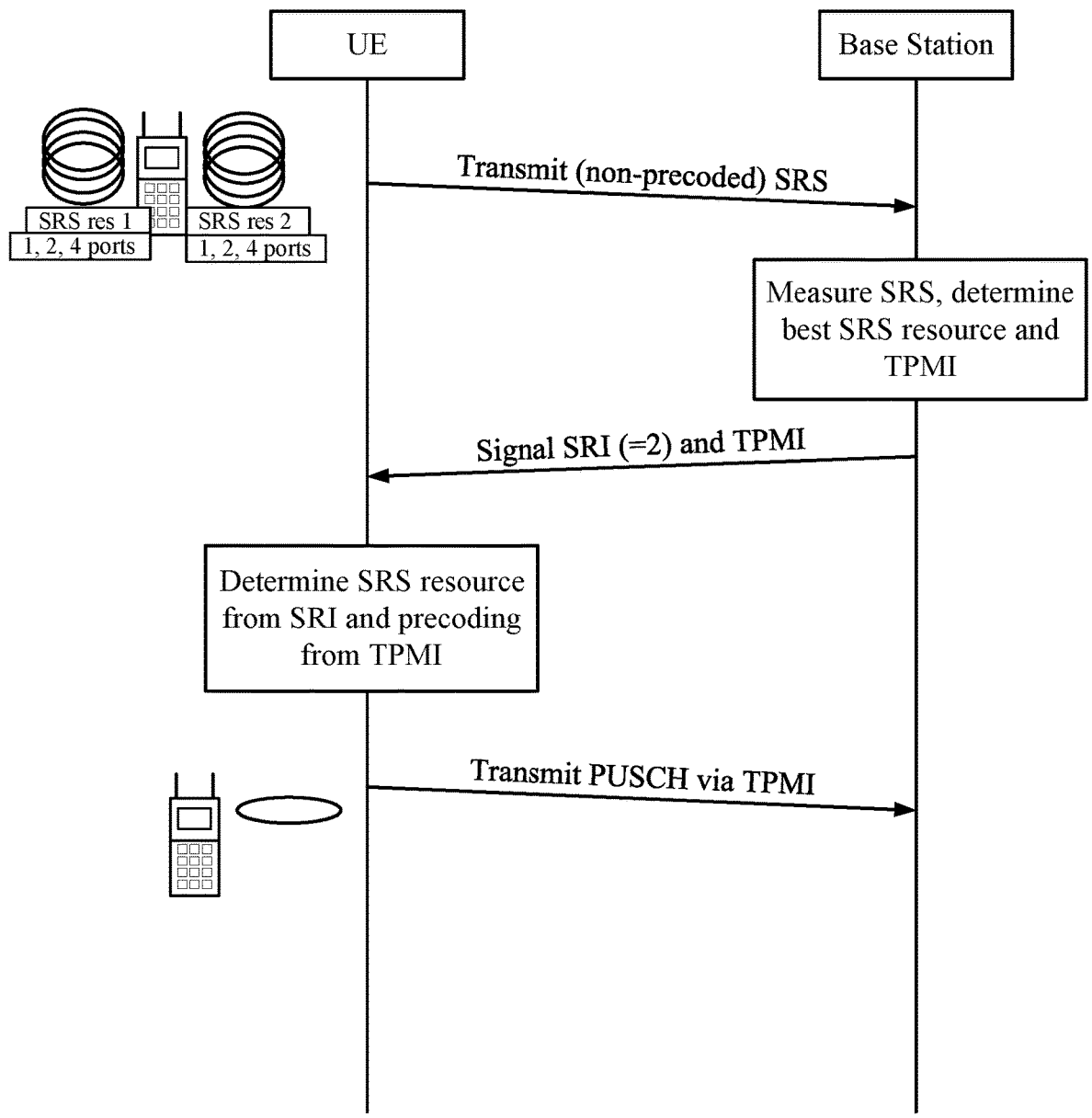
FIG. 5 is a call flow diagram illustrating an example of codebook based UL transmission, in accordance with certain aspects of the present disclosure.

FIG. 5 is a call flow diagram illustrating an example of conventional codebook based UL transmission using a wideband precoder. As illustrated, a UE transmits (non-precoded) SRS with up to 2 SRS resources (with each resource having 1, 2 or 4 ports). The gNB measures the SRS and, based on the measurement, selects one SRS resource and a wideband precoder to be applied to the SRS ports within the selected resource.

As illustrated, the gNB configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI.

The UE determines the selected SRS resource from the SRI and precoding from TPMI and transmits PUSCH accordingly.

Figure 6:
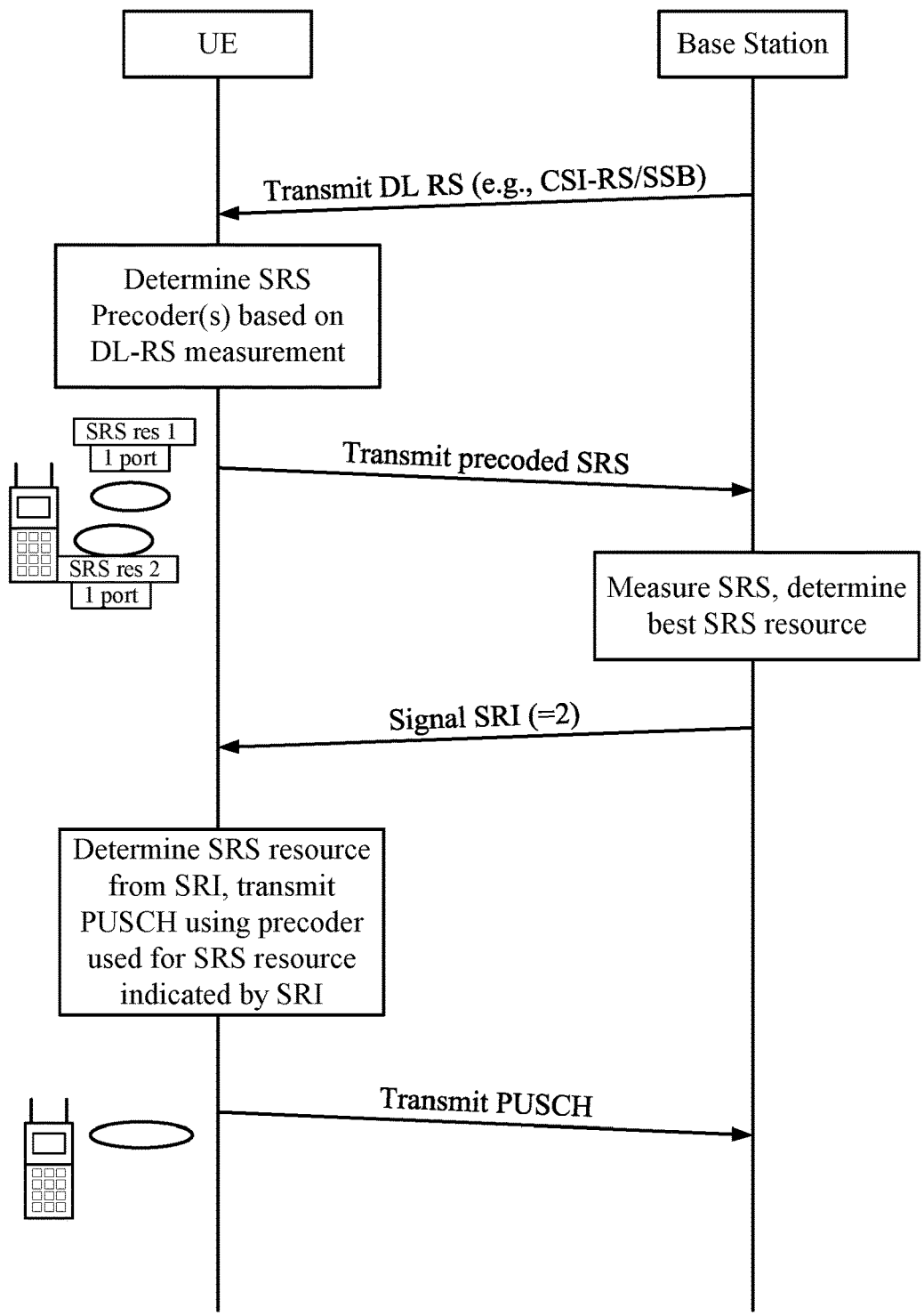
FIG. 6 is a call flow diagram illustrating an example of non-codebook based UL transmission, in accordance with certain aspects of the present disclosure.

FIG. 6 is a call flow diagram illustrating an example of non-codebook based UL transmission. As illustrated, a UE transmits (precoded) SRS. While the example shows 2 SRS resources, the UE may transmit with up to 4 SRS resources (with each resource having 1 port). The gNB measures the SRS and, based on the measurement, selects one or more SRS resource. In this case, since the UE sent the SRS precoded, by selecting the SRS resource, the gNB is effectively also selecting precoding. For non-codebook based UL transmission, each SRS resource corresponds to a layer. The precoder of the layer is actually the precoder of the SRS which is emulated by the UE. Selecting N SRS resources means the rank is N. The UE is to transmit PUSCH using the same precoder as the SRS.

As illustrated, the gNB configures the UE with the selected SRS resource via an SRS resource indictor (SRI). For a dynamic grant, the SRI may be configured via DCI format 0_1. For a configured grant, the SRI may be configured via RRC or DCI.

Overview of TPMI Selection in O-RAN

Figure 7:
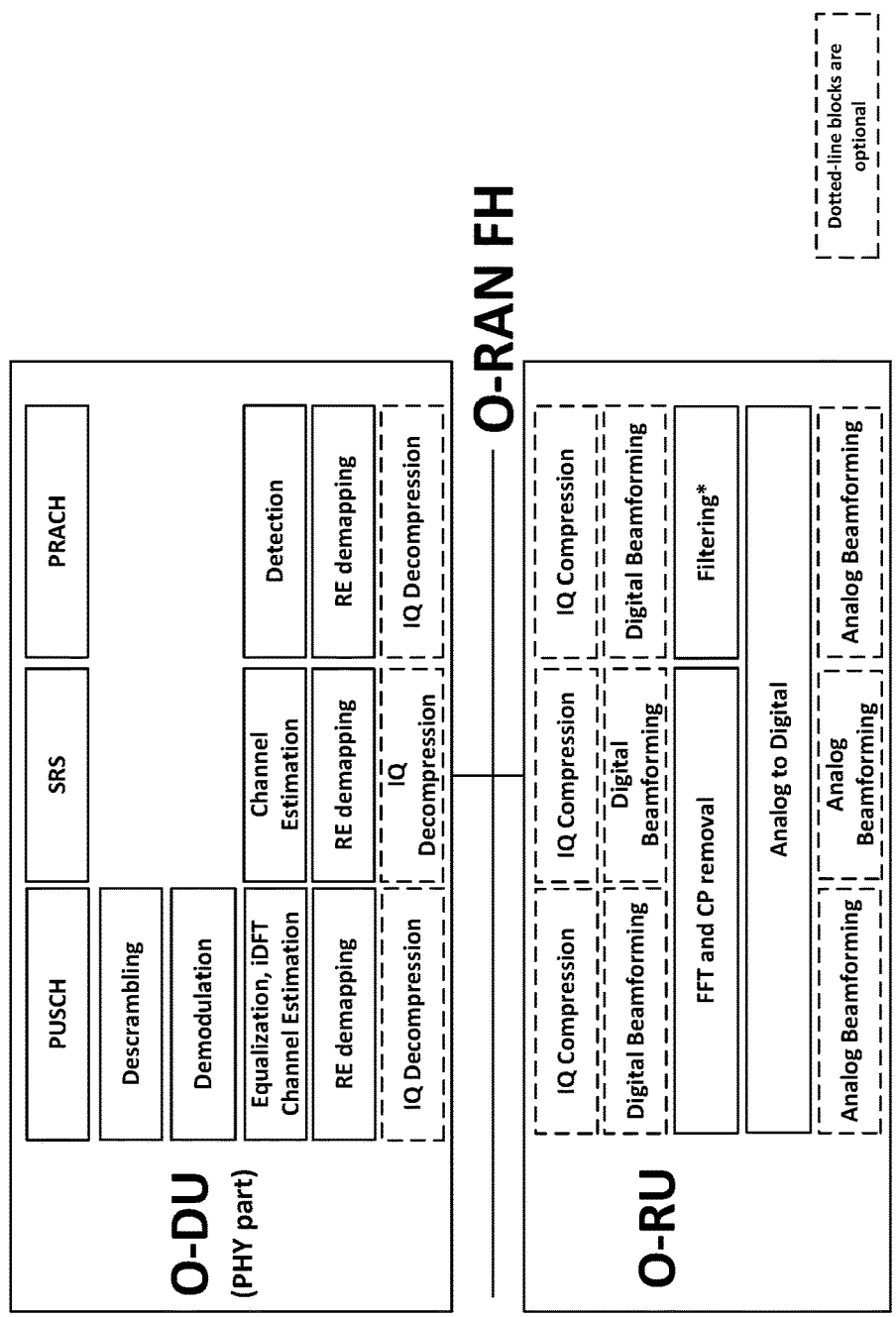
FIG. 7 depicts an example description of lower layer uplink link split between O-RAN Distributed Unit (O-DU) and O-RAN Radio Unit (O-RU).

As noted above, O-RAN specifies control plane, user plane and synchronization plane protocols used over the fronthaul interface linking the O-DU (O-RAN Distributed Unit) with the O-RU (O-RAN Radio Unit) with a Lower Layer Functional Split based architecture. FIG. 7 illustrates an example of an O-RAN architecture 700 implementing such as split for uplink transmissions, sent from an O-RU to an O-DU via a fronthaul (FH) interface.

In certain cases, current specified functional splits may be less than ideal and may result in degraded performance in scenarios, such as massive MIMO (mMIMO), mobility, or interference scenarios. Aspects of the present disclosure may help address this potential issue and may help improve performance in such scenarios. In some cases, the techniques proposed herein may allow for what is effectively a backward-compatible variant of a (7-2x functional split) fronthaul interface to allow an enhancement of the UL air interface performance, especially in the case of mMIMO.

As noted above, beam-forming weights for uplink transmissions are conventionally based on sounding reference signal (SRS) channel estimates, while channel estimation based on demodulation reference signals (DMRS) is applied for demodulation.

Figure 8:
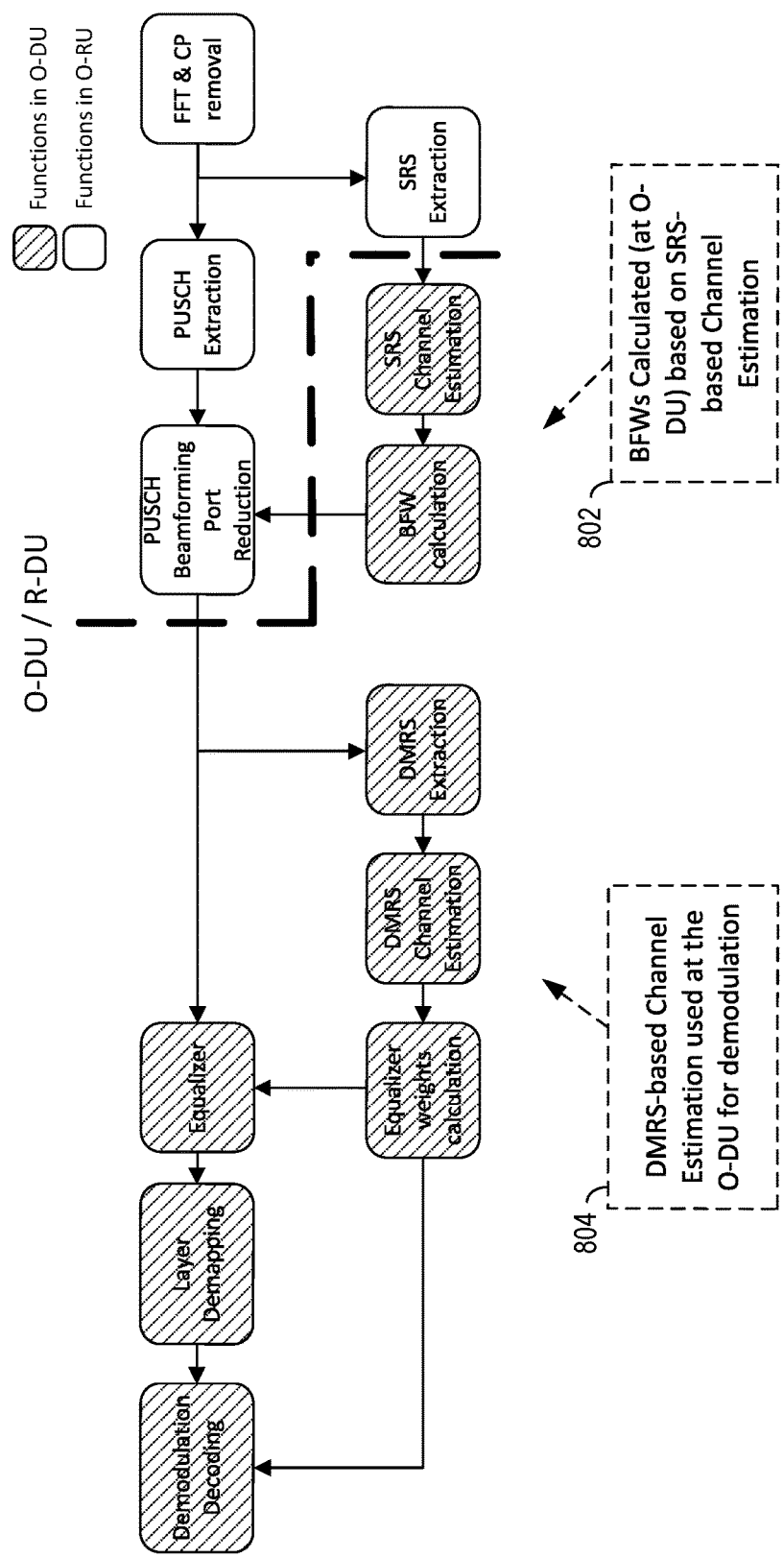
FIG. 8 depicts an example specification for functional splitting between O-DU and O-RU.

An example 800 of this approach is shown in FIG. 8. As noted at 802, beamforming weights (BFWs), calculated at the O-DU based on SRS-based channel estimation, are applied at the O-RU. As noted at 804, at the O-DU, channel estimation based on DMRS is applied for demodulation.

As noted above, for codebook-based uplink transmissions, the gNB indicates a Transmitted Precoding Matrix Indication (TPMI) to a UE, the selection of which may be performed by a TPMI selection component at the O-DU. This TPMI selection component may be implemented at certain layer, referred to as LI-High (layer one high), at the O-DU.

Figure 9:
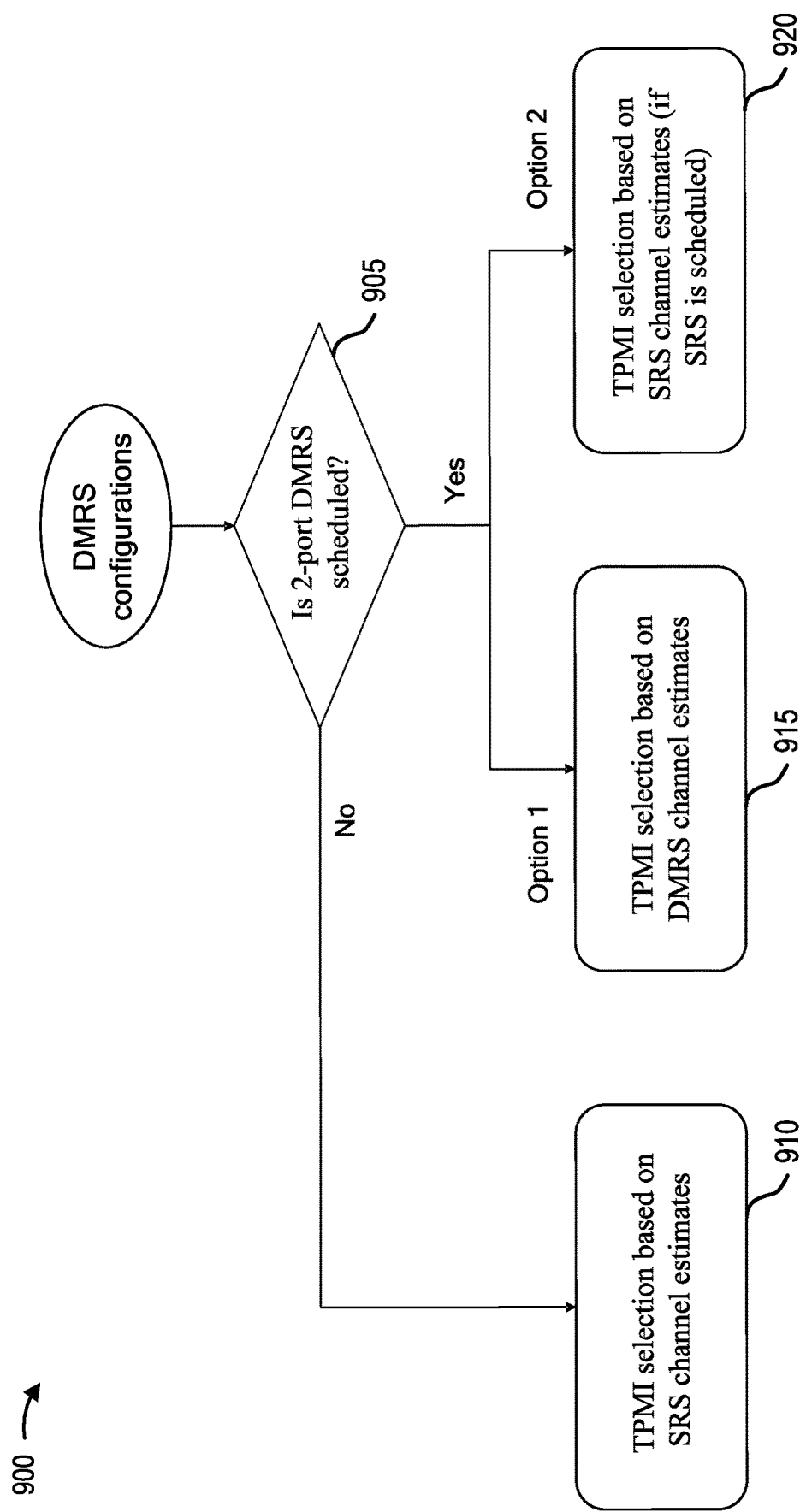
FIG. 9 is a flow diagram illustrating example TPMI selection by a network entity.

The flow diagram 900 of FIG. 9 illustrates how such a selection component may allow TPMI selection based on DMRS-based channel estimates and/or SRS-based channel estimates to determine the best TPMI to be used (by the UE) for next UL scheduled transmission. The TPMI selection can be based on aperiodic SRS transmitted with scheduled PUSCH or based on DMRS.

The example in FIG. 9 illustrates an example TPMI selection approach that can be applied at gNB side for UL MIMO rank less than or equal to two. As illustrated, if 2-port DMRS is not scheduled (as determined at 905), the TPMI selection may be based on SRS channel estimates (at 910). If 2-port DMRS is scheduled, TPMI selection may be based on DMRS-based channel estimates (at 915) or SRS-based channel estimates (at 920—assuming SRS is scheduled).

As noted above, SRS is typically transmitted without any precoding, while DMRS is transmitted with precoding applied to the DMRS pilots at the UE. Thus, when TPMI selection is based on DMRS, the O-DU may need to account for the precoding by performing what is referred to as a reversion, or inverting, of the DMRS precoding.

Deriving BFWs based on SRS may have an advantage, in some cases, resulting in an envelope beamformer that is stable with respect to fast fading channel. This is because TPMI is generally reflective of the fast fading in the envelope beam.

In some cases, however, TPMI selection based on DMRS-based channel estimates may be preferred. For example, higher throughput may be expected with TPMI selected based on DMRS-based channel estimates, when compared to TPMI selected based on SRS-based channel estimates.

As noted above, however, one potential challenge arises when TPMI is computed based on DMRS-based channel estimation, in that the effects of this precoding may need to be accounted for by DMRS reversion, to account for the precoding of DMRS applied at the UE. This is particularly true when BFWs may be derived from SRS or DMRS channel estimates.

When BFWs are derived from SRS channel estimates, the beamformer (combiner, or port reduction matrix) does not need to take the TPMI into account (as SRS is sent without precoding). If BFWs are derived based on DMRS channel estimates, however, it may not be clear how the O-DU can determine it should perform the precoding reversion operation, when performing TPMI selection. If the O-RU is performing beamforming based on DMRS, without considering effects that DMRS is already precoded, it may be difficult for the O-DU to know whether signals coming from the O-RU should be reverted (based on the TPMI applied by UE) or if this was already accounted for in the beamforming process. This could lead to less than optimal TPMI selection, for example, if the O-DU should have performed the reversion procedure but does not (or if the O-DU performs the reversion procedure when this was handled at the O-RU).

Aspects Related to TPMI Selection Based on UL Beamforming and Channel Estimate Signaling Aspects of the present disclosure help address this scenario, for example, by providing a signaling mechanism whereby the O-DU can learn whether the O-RU is performing BF based on DMRS with or without consideration to the effects of precoding already applied at the UE when transmitting DMRS. In other words, the O-DU can know if it needs to apply reversion to DMRS samples or if this was already done at the O-RU (as part of the beamforming/port reduction).

Figure 10:
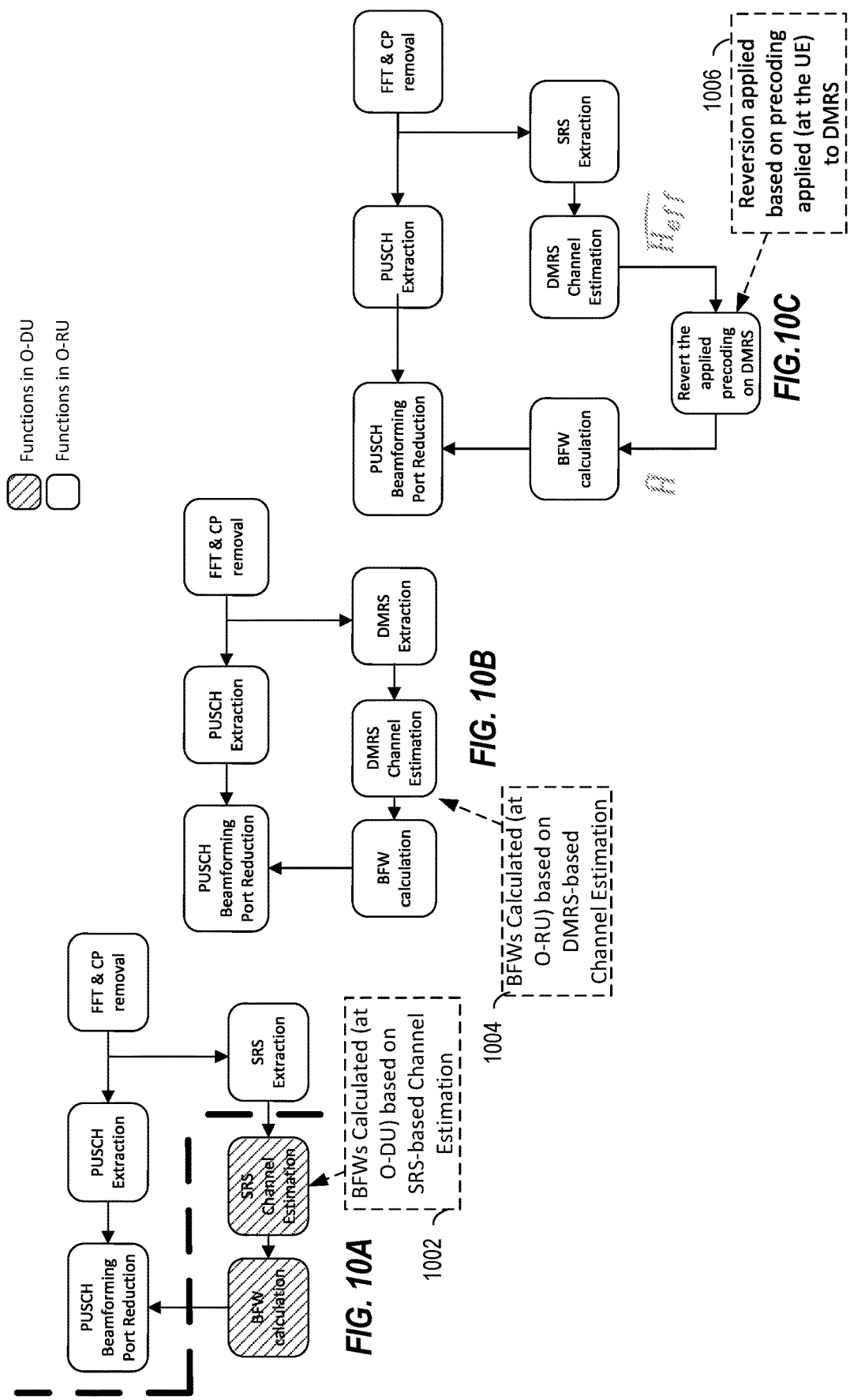
FIGS. 10A, 10B, and 10C depict examples of beam form weight (BFW) calculation, in accordance with certain aspects of the present disclosure.

An example of such a solution may be understood with reference to the examples shown in FIGS. 10A, 10B, and 10C.

The example shown in FIG. 10A corresponds to the conventional case described above. As shown at 1002, in the conventional case, BFW calculation is performed at the O-DU based on SRS-based channel estimation. The example shown in FIG. 10B illustrates a proposal to perform BFW calculation, in accordance with aspects of the present disclosure. As shown at 1004, in this case BFW calculation may be performed at the O-RU based on DMRS-based channel estimation. As noted above, this scenario could lead to less than optimal TPMI selection, if the O-DU is not aware of whether or not a reversion procedure (to account for precoding applied to DMRS at the UE) was performed at the O-RU.

The example shown in FIG. 10C illustrates a possible solution, in accordance with aspects of the present disclosure. As shown at 1006, in this solution, a reversion process may be performed at the O-RU to account for precoding applied to DMRS at the UE. Operation according to the example shown in FIG. 10C may be described as follows.

In some cases, if the If O-RU has the capability to support BFWs based on DMRS CEs, it may be assumed that the O-RU also supports reverting the applied precoding on DMRS. As used in this context, reverting the applied precoding on DMRS may refer to an operation to effectively determine the DMRS CEs without precoding. For example, assuming:

$$\widetilde{H_{eff}} = \hat{H}*P$$

represents the channel estimates from DMRS pilots, the reversion operation could be viewed as equivalent to multiplying by $P^{-1}$ the $\widetilde{H_{eff}}$ to obtain H as an input for BFW calculation. This operation can be applied when the number of ports equal the number of layers (e.g., when P is a square precoding matrix). More generally, the reversion procedure may correspond to an operation that approximates a precoding matrix inversion and may involve regularization, preprocessing of the CEs, and/or post processing of the inversion outcome.

On the O-DU side, the TPMI selection can still be performed (as described above with reference to FIG. 9), whatever the O-RU capability (e.g., the BFW calculations may be based on non-precoded SRS or reverted DMRS channel estimates). Thus, this solution may be considered as backward compatible with certain existing functional splits (e.g., the 7-2 functional split) currently defined in standards.

In some cases, the O-RU may signal, to the O-DU, an indication of: 1) a first capability to support DMRS-based BFW calculation; and/or 2) a second capability to perform the reversion procedure (e.g., to revert the applied precoding on DMRS).

The O-DU may then perform TPMI selection based on the signaled capability. For example, if the O-RU indicates it has the first capability (to support BFWs based on DMRS CEs) and the second capability (to perform reversion), the O-DU may not need to perform reversion on its end, when performing the TPMI selection procedure based on DMRS CEs (as it may assume this was performed at the O-RU). On the other hand, if the O-RU indicates it has the first capability (to support BFWs based on DMRS CEs) but not the second capability (to perform reversion), the O-DU may need to perform the reversion procedure (there is no change at the O-DU regarding the TPMI selection). In some cases, the O-DU may signal the O-RU based on its indicated support, whether to perform DMRS based BWF calculation and/or whether to perform DMRS reversion at the O-RU. Thus, using the signaling mechanisms proposed herein, the O-DU may know, when BFWs are derived based on DMRS channel estimates and when it should perform the precoding reversion operation, when performing TPMI selection.

In some cases, TPMI may not be full rank and, hence, $P^{-1}$ does not always exist. In such cases, O-RUs supporting the second capability (to perform reversion) may select between different options for performing reversion.

For example, according to a first option, the O-RU may apply an approximate reversion back to an un-precoded basis (e.g., an un-precoded SRS basis), to allow O-DU to obtain an approximation of the H that reflects the reduced rank. One example may be where the approximate reversion is represented by right-hand $P_{rhs}^+$, where $P_{rhs}^+$ is the right-hand pseudoinverse of P With $\widetilde{H_{eff}} = \hat{H}*P$, $\hat{H}_{approx}$ can be a least square approximate of $\hat{H}$, by—for instance—setting $$\hat{H}_{appox} = \widetilde{H_{eff}}*P_{rhs}^+.$$

In general, the approximate reversion may be designed to help ensure that the rank of the channel observations are preserved, while projecting the DMRS-based observations back to the unprecoded basis (e.g., of SRS antenna ports).

According to a second option, a supporting O-DU may determine that the DMRS-based observations could not or were not projected back to the SRS basis. In such cases, the observation at the O-DU may be based on explicit signaling from the O-RU, or the observation may be from the O-DU's own awareness of non-full-rank TPMI.

In some cases, that may be considered an O-RU driven approach, the O-RU signals to the O-DU whether the reduced rank is representative of the un-precoded basis or not. In some cases, that may be considered an O-DU driven approach, the O-DU signals to the O-RU whether it expects the O-RU to project the port-reduced streams to an un-precoded basis. In such cases, TPMI selection may be assisted by procedure to indicate, to the O-RU, whether specific TPMIs (e.g. non-full-rank) should be used for the projection to the un-precoded basis. In both the O-RU and O-DU driven approaches, the determination (at O-RU or O-DU) may take in account TMPI rank or other factors (e.g. availability of FH bandwidth).

In some cases, precoded DMRS observations may be subject to additional processing (e.g. whitening) that, ideally, should not impact scheduler decisions. In some other cases, providing full-rank DMRS projection may result in increased FH bandwidth. In other cases, the O-RU can assist in subsequent beamforming by referring to particular representations of channel estimates.

According to certain aspects, to address such cases, the O-RU may provide, in addition to or separately from the FH-reduced IQ streams, a representation of the channel observation in one or a combination of the following: signal to interference and noise ratio (SINR) observations per DMRS or per SRS port, correlation of port observations between different precoded or un-precoded IQ streams, un-precoded (i.e. w.r.t SRS basis) channel matrix H, or singular value decomposition (SVD) representation of the un-precoded channel matrix.

The techniques described above, regarding additional processing of precoded DMRS and/or providing one or a combination of the information described above, may be applied to SRS or DMRS-based channel observations. In some cases, the information may be provided at a physical resource block (PRB) resolution, a PRB group (PRG) resolution, or a wideband resolution.

Example Operations

Figure 11:
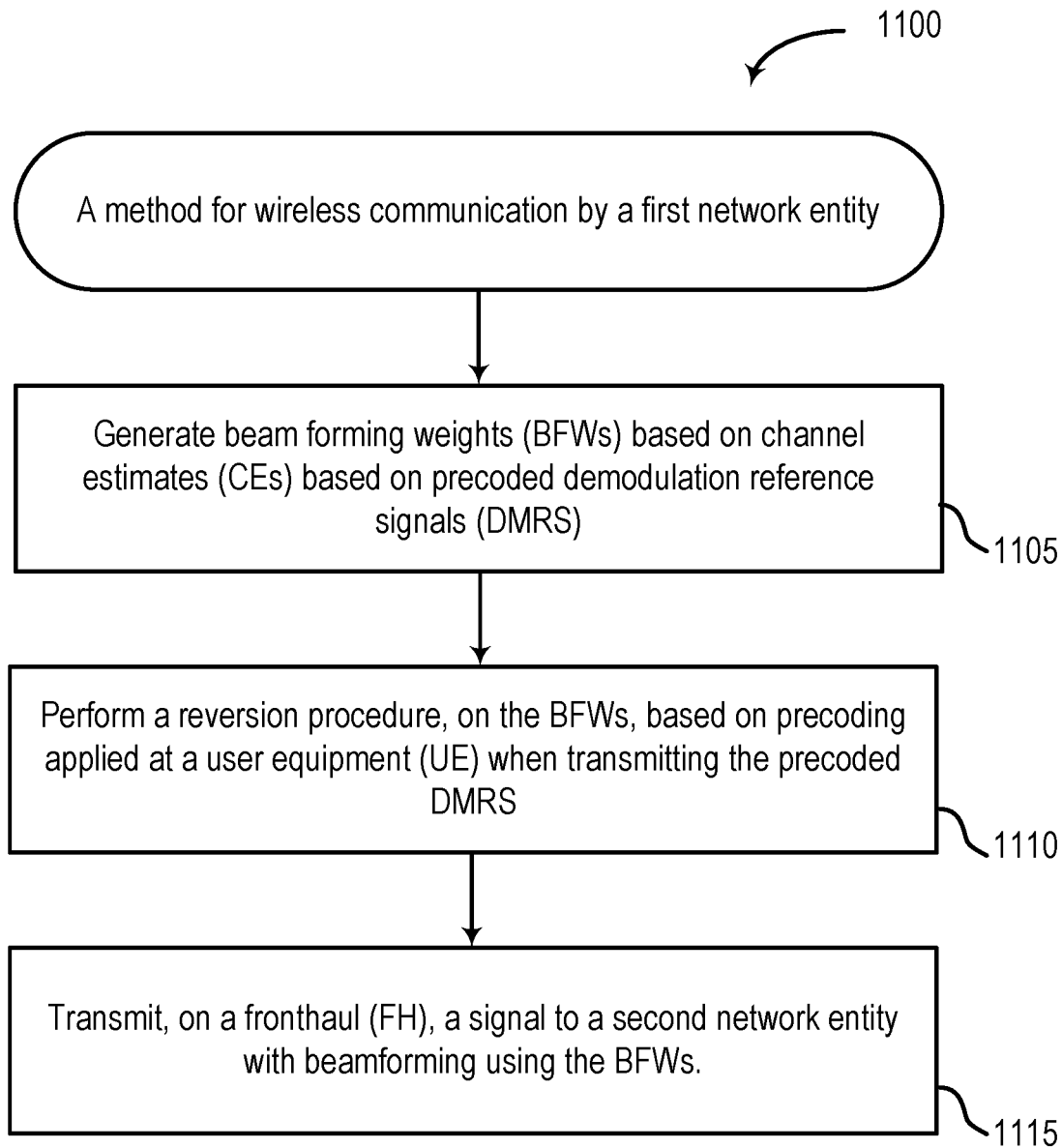
FIG. 11 depicts a method for wireless communication by a first network entity, in accordance with aspects of the present disclosure.

FIG. 11 shows a method 1100 for wireless communication by a first network entity (NE). For example, operations of method 1100 may be performed by an RU, such as RU 440 of FIG. 4.

Method 1100 begins at 1105 by generating beam forming weights (BFWs) based on channel estimates (CEs) based on precoded demodulation reference signals (DMRS). Method 1100 then proceeds to step 1110 by performing a reversion procedure, on the BFWs, based on precoding applied at a user equipment (UE) when transmitting the precoded DMRS. Method 1100 then proceeds up to step 1115 by transmitting, on a fronthaul (FH), a signal to a second network entity with beamforming using the BFWs.

Figure 12:
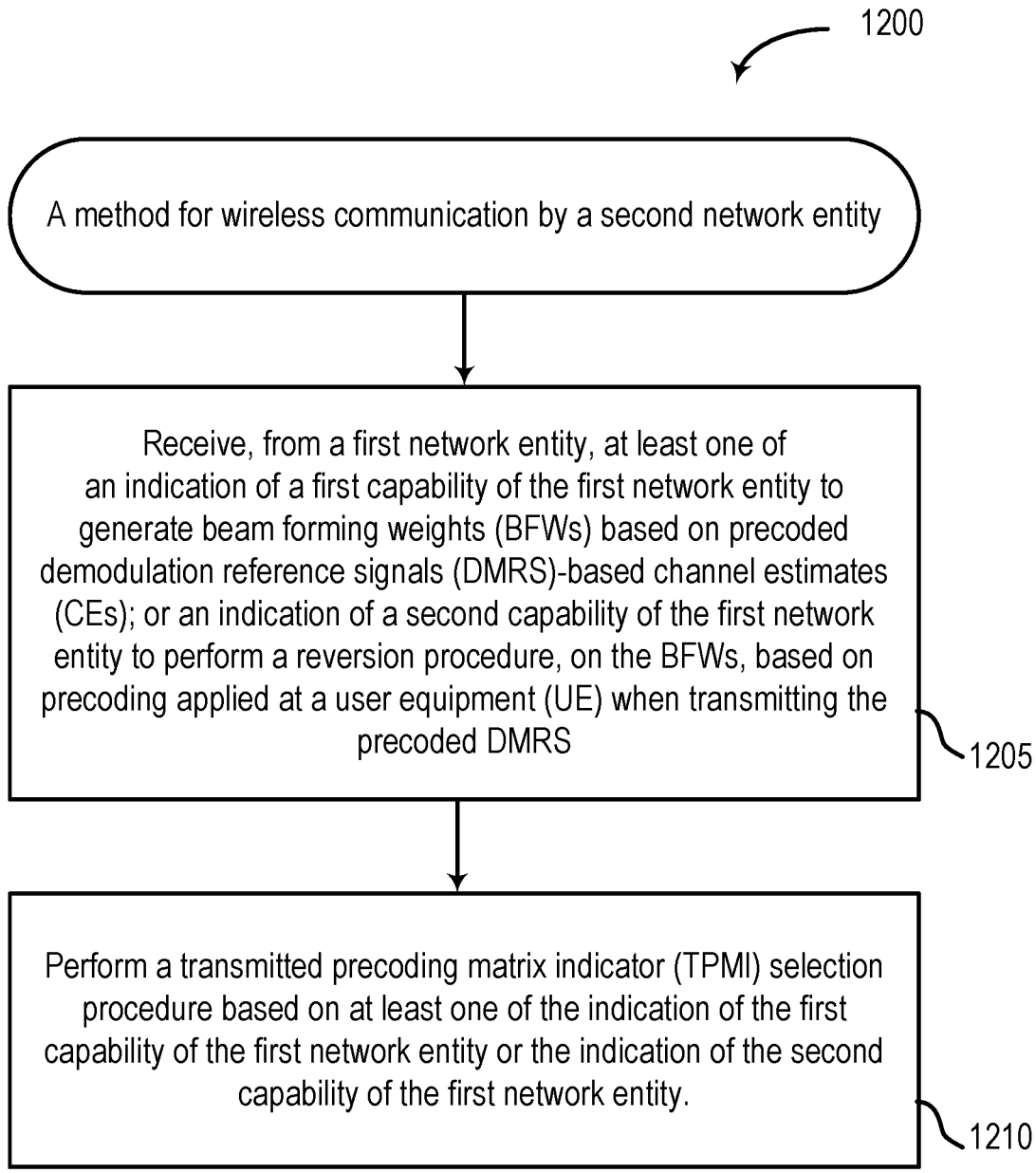
FIG. 12 depicts a method for wireless communication by a second network entity, in accordance with aspects of the present disclosure.

FIG. 12 shows a method 1200 for wireless communication by a second network entity (NE). For example, operations of method 1200 may be performed by a distributed unit, such as DU 430 of FIG. 4.

Method 1200 begins at 1205 by receiving, from a first network entity, at least one of an indication of a first capability of the first network entity to generate beam forming weights (BFWs) based on precoded demodulation reference signals (DMRS)-based channel estimates (CEs); or an indication of a second capability of the first network entity to perform a reversion procedure, on the BFWs, based on precoding applied at a user equipment (UE) when transmitting the precoded DMRS. Method 1200 then proceeds to step 1210 by performing a transmitted precoding matrix indicator (TPMI) selection procedure based on at least one of the indication of the first capability of the first network entity or the indication of the second capability of the first network entity.

Figure 13:
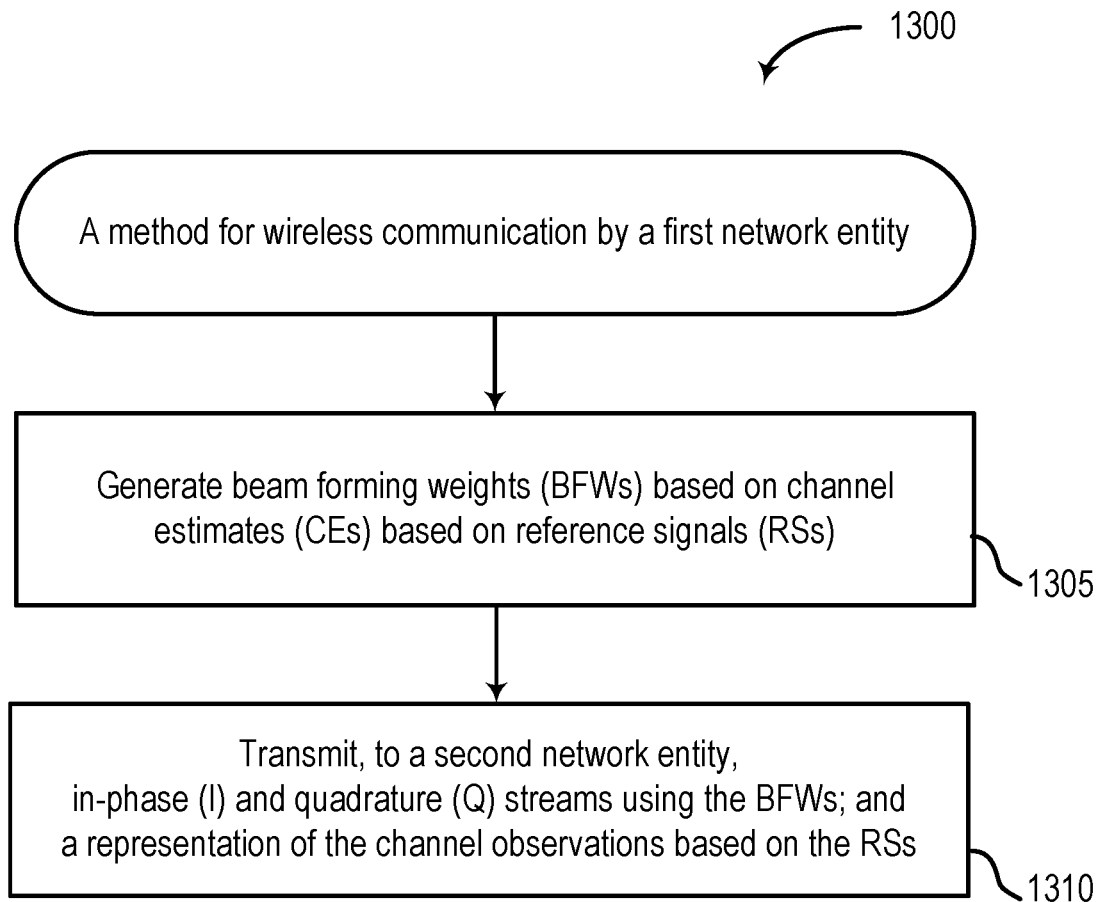
FIG. 13 depicts a method for wireless communication by a first network entity, in accordance with aspects of the present disclosure.

FIG. 13 shows a method 1300 for wireless communication by a first network entity (NE). For example, operations of method 1300 may be performed by an RU, such as RU 440 of FIG. 4.

Method 1300 begins at 1305 by generating beam forming weights (BFWs) based on channel estimates (CEs) based on reference signals (RSs). Method 1300 then proceeds to step 1310 by transmitting, to a second network entity, in-phase (I) and quadrature (Q) streams using the BFWs; and a representation of the channel observations based on the RSs.

Figure 14:
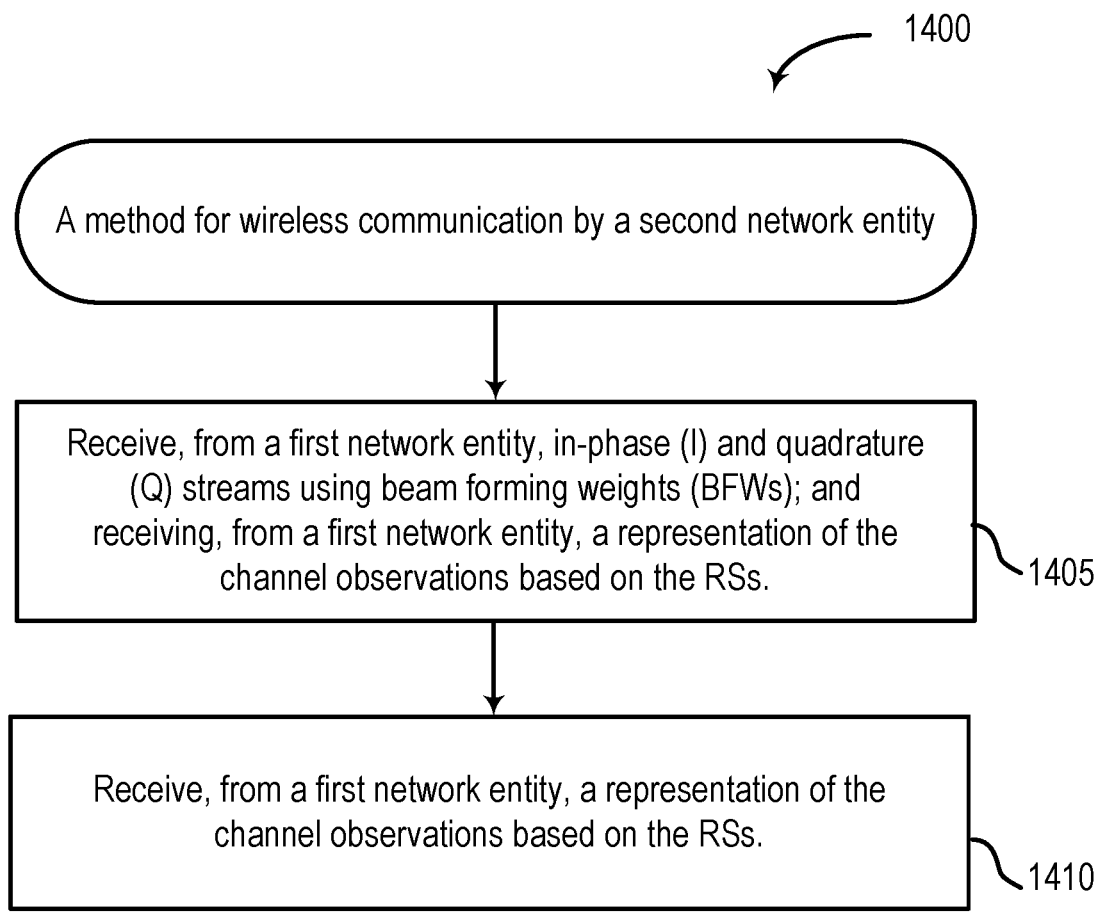
FIG. 14 depicts a method for wireless communication by a second network entity, in accordance with aspects of the present disclosure.

FIG. 14 shows a method 1400 for wireless communication by a second network entity (NE). For example, operations of method 1400 may be performed by a distributed unit, such as DU 430 of FIG. 4.

Method 1400 begins at 1405 by receiving, from a first network entity, in-phase (I) and quadrature (Q) streams using beam forming weights (BFWs); and receiving, from a first network entity, a representation of the channel observations based on the RSs. Method 1400 then proceeds to step 1410 by receiving, from a first network entity, a representation of the channel observations based on the RSs.

Example Wireless Communication Devices

Figure 15:
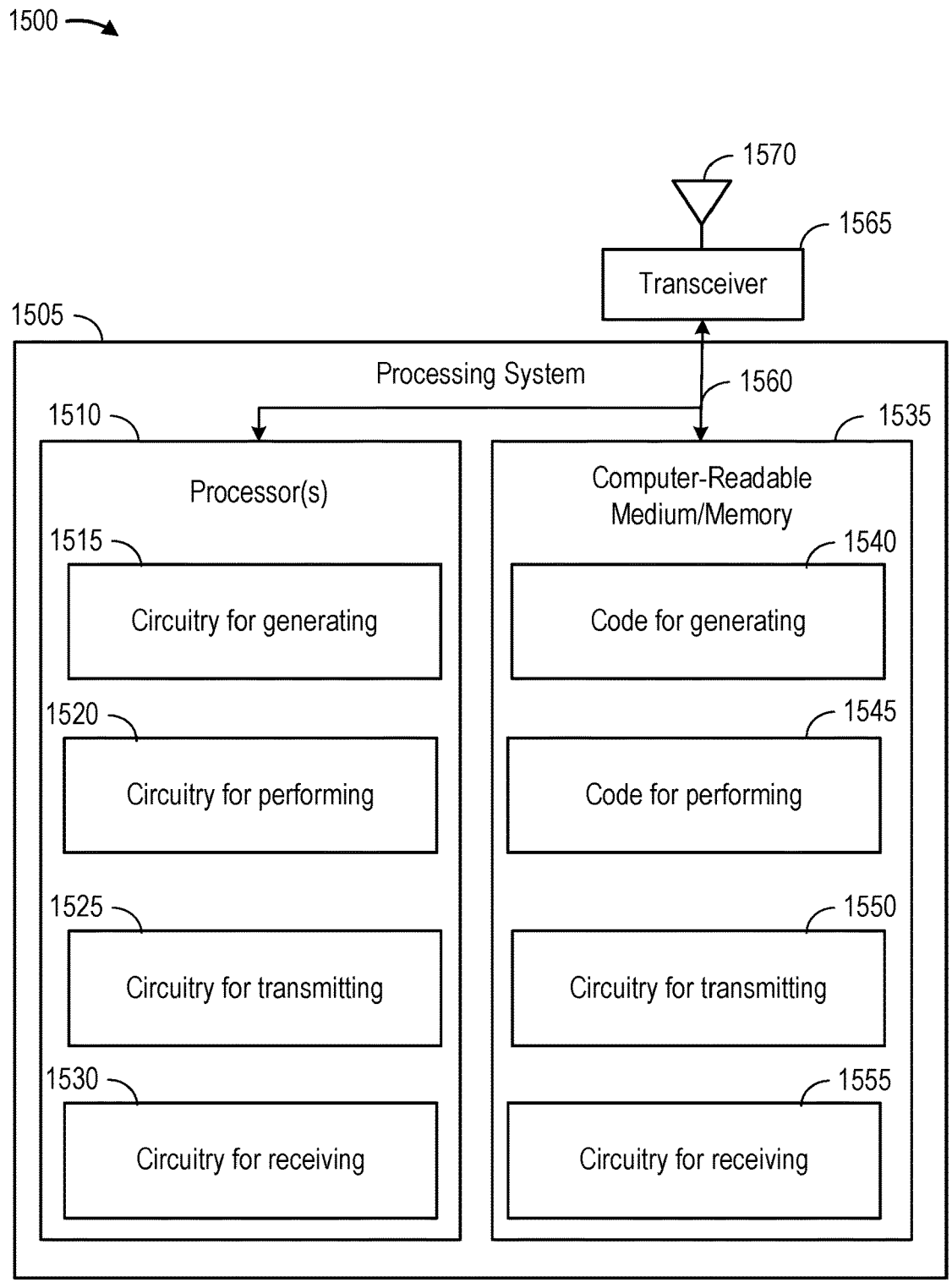
FIG. 15 depicts aspects of an example communications device, in accordance with certain aspects of the present disclosure.

FIG. 15 depicts aspects of an example communications device 1500. In some aspects, communications device 1500 is a network entity, such as a component of a disaggregated base station, such as a RU 420 or DU 430 described above with respect FIG. 4.

The communications device 1500 includes a processing system 1505 coupled to the transceiver 1565 (e.g., a transmitter and/or a receiver). The transceiver 1565 is configured to transmit and receive signals for the communications device 1500 via the antenna 1570, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 258, transmit processor 264, TX MIMO processor 266, and/or controller/processor 280, as described with respect to FIG. 2. The one or more processors 1510 are coupled to a computer-readable medium/memory 1535 via a bus 1560. In certain aspects, the computer-readable medium/memory 1535 is configured to store instructions (e.g., computer-executable code) that when executed by the one or more processors 1510, cause the one or more processors 1510 to perform the methods 1100, 1200, 1300, and 1400 described with respect to FIGS. 11-14, or any aspect related to it. Note that reference to a processor performing a function of communications device 1500 may include one or more processors 1510 performing that function of communications device 1500.

In the depicted example, computer-readable medium/memory 1535 stores code (e.g., executable instructions), such as code for generating 1540, code for performing 1545, code for transmitting 1550, and code for receiving which may cause the communications device 1500 to perform the methods 1100, 1200, 1300, and 1400 with respect to FIGS. 11-14 or any aspect related to it.

The one or more processors 1510 include circuitry configured to implement (e.g., execute) the code stored in the computer-readable medium/memory 1535, including circuitry such as circuitry for generating 1540, code for performing 1545, code for transmitting 1550, and code for receiving 1565, which may cause the communications device 1500 to perform the methods 1100, 1200, 1300, and 1400 described with respect to FIGS. 11-14, or any aspect related to it.

Various components of the communications device 1500 may provide means for performing the methods 1100, 1200, 1300, and 1400 described with respect to FIGS. 11-14, or any aspect related to it. For example, means for transmitting, sending or outputting for transmission may include transceivers 254 and/or antenna(s) 252 of the BS 102 illustrated in FIG. 2 and/or the transceiver 1565 and the antenna 1570 of the communications device 1500 in FIG. 15. Means for receiving or obtaining may include transceivers 254 and/or antenna(s) 252 of the BS 102 illustrated in FIG. 2 and/or the transceiver 1565 and the antenna 1570 of the communications device 1500 in FIG. 15.

Example Clauses

Implementation examples are described in the following numbered clauses:

Clause 1. A method for wireless communication by a first network entity, comprising: generating beam forming weights (BFWs) based on channel estimates (CEs) based on precoded demodulation reference signals (DMRS); performing a reversion procedure, on the BFWs, based on precoding applied at a user equipment (UE) when transmitting the precoded DMRS; and transmitting, on a fronthaul (FH), a signal to a second network entity with beamforming using the BFWs.

Clause 2. The method of Clause 1, wherein performing the reversion procedure comprises applying an inverse operation that approximates a precoding matrix inversion to the CEs based on the precoded DMRS.

Clause 3. The method of Clause 2, wherein the inverse operation involves at least one of regularization, preprocessing of the CEs, or post processing of an inversion outcome.

Clause 4. The method of Clause 2, wherein, when the BFWs are generated based on CEs based on precoded DMRS, the first entity applies an inverse of a precoding matrix to a CE based on the precoded DMRS for a full-rank transmitted precoder matrix indicator (TPMI).

Clause 5. The method of any one of Clauses 1-4, further comprising providing, to the second network entity: an indication of a first capability of the first network entity to generate BFWs based on DMRS-based CEs; and an indication of a second capability of the first network entity to perform the reversion procedure.

Clause 6. The method of Clause 5, further comprising receiving, from the second network entity, an indication of whether or not the first network entity is to perform the reversion procedure.

Clause 7. The method of any one of Clauses 1-6, wherein the precoding is based on a transmitted precoder matrix indicator (TPMI) that has a reduced rank.

Clause 8. The method of Clause 7, wherein the reversion procedure comprises an approximate reversion procedure.

Clause 9. The method of Clause 7, wherein the approximate reversion procedure is designed to ensure that a rank of channel observations are preserved, while projecting the DMRS-based CE to an un-precoded basis.

Clause 10. The method of Clause 8, further comprising providing an indication, to the second network entity, of whether the DMRS-based CE was projected to the un-precoded basis.

Clause 11. The method of any of Clauses 9-10, wherein the un-precoded basis corresponds to the basis of ports sounded by sounding reference signals (SRS) to which the precoding was applied at the UE.

Clause 12. The method of Clause 7, further comprising providing an indication, to the second network entity, of whether or not the reduced rank is representative of the un-precoded basis.

Clause 13. The method of Clause 7, further comprising receiving, from the second network entity, an indication of whether the second network entity expects the first network entity to project port-reduced streams to an un-precoded basis.

Clause 14: The method of Clause 13, wherein the indication indicates whether the first network entity should use specific precoding for the projection to the un-precoded basis.

Clause 15: The method of any of Clauses 13-14, wherein the un-precoded basis corresponds to the basis of ports sounded by sounding reference signals (SRS) to which the precoding was applied at the UE.

Clause 16: The method of Clause 14, wherein the specific precoding corresponds to a TPMI.

Clause 17: A method for wireless communication by a second network entity, comprising: receiving, from a first network entity, at least one of an indication of a first capability of the first network entity to generate beam forming weights (BFWs) based on precoded demodulation reference signals (DMRS)-based channel estimates (CEs); or an indication of a second capability of the first network entity to perform a reversion procedure, on the BFWs, based on precoding applied at a user equipment (UE) when transmitting the precoded DMRS; and performing a transmitted precoding matrix indicator (TPMI) selection procedure based on at least one of the indication of the first capability of the first network entity or the indication of the second capability of the first network entity.

Clause 18: The method of Clause 17, wherein performing the TPMI selection procedure comprises performing a reversion procedure if the first network entity indicates it lacks the ability to perform the reversion procedure.

Clause 19: The method of any one of Clauses 17-18, wherein the first network entity indicates the precoding is based on a transmission precoder matrix indicator that is reduced rank.

Clause 20: The method of Clause 19, wherein the first network entity indicates the reversion procedure comprises an approximate reversion procedure.

Clause 21: The method of Clause 20, wherein the approximate reversion procedure is designed to ensure that a rank of channel observations are preserved, while projecting the DMRS-based CE to an un-precoded basis.

Clause 22: The method of Clause 21, further comprising receiving an indication, from the first network entity, of whether the DMRS-based CE was projected to the un-precoded basis.

Clause 23: The method of Clause 20, further comprising receiving an indication, from the first network entity, of whether or not the reduced rank is representative of the un-precoded basis.

Clause 24: The method of Clause 20, further comprising transmitting, to the first network entity, an indication of whether the second network entity expects the first network entity to project port-reduced streams to an un-precoded basis.

Clause 25: The method of Clause 24, wherein the indication indicates whether the first network entity should use specific TPMIs for the projection to the un-precoded basis.

Clause 26: The method of any of Clauses 21-25, wherein the un-precoded basis corresponds to the basis of ports sounded by sounding reference signals (SRS) to which the precoding was applied at the UE.

Clause 27: A method for wireless communication by a first network entity, comprising: generating beam forming weights (BFWs) based on channel estimates (CEs) based on reference signals (RSs); and transmitting, to a second network entity, in-phase (I) and quadrature (Q) streams using the BFWs; and a representation of the channel observations based on the RSs.

Clause 28: The method of Clause 27, wherein the representation of the CEs is transmitted separate from the IQ streams.

Clause 29: The method of any one of Clauses 27-28, wherein transmitting the representation of the CEs to the second network entity comprises transmitting at least one of: signal to interference and noise (SINR) or signal to noise (SNR) observations per reference signal (RS) port; correlation of port observations between different precoded or un-precoded IQ streams; an un-precoded channel matrix; or a singular value decomposition (SVD) representation of the un-precoded channel matrix.

Clause 30: The method of any one of Clauses 27-29, wherein the RS comprises at least one of demodulation reference signals (DMRS) or sounding reference signals (SRS), or a result of a reversion procedure applied to DMRS CEs to restore an un-precoded basis.

Clause 31: The method of any one of Clauses 27-30, wherein the representation of the channel observations based on the RSs are provided at a physical resource block (PRB), PRB group (PRG), or wideband resolution.

Clause 32: A method for wireless communication by a second network entity, comprising: receiving, from a first network entity, in-phase (I) and quadrature (Q) streams using beam forming weights (BFWs); and receiving, from a first network entity, a representation of the channel observations based on the RSs.

Clause 33: The method of Clause 32, wherein the representation of the CEs is received separate from the IQ streams.

Clause 34: The method of any one of Clauses 32-33, wherein receiving the representation of the CEs to the second network entity comprises receiving at least one of: signal to interference and noise (SINR) or signal to noise (SNR) observations per reference signal (RS) port; correlation of port observations between different precoded or un-precoded IQ streams; an un-precoded channel matrix; or a singular value decomposition (SVD) representation of the un-precoded channel matrix.

Clause 35: The method of any one of Clauses 32-34, wherein the RS comprises at least one of demodulation reference signals (DMRS) or sounding reference signals (SRS), or a result of a reversion procedure applied to DMRS CEs to restore an un-precoded basis.

Clause 36: The method of any one of Clauses 32-35, wherein the representation of the channel observations based on the RSs are provided at a physical resource block (PRB), PRB group (PRG), or wideband resolution.

Clause 37: A processing system, comprising: a memory comprising computer-executable instructions; one or more processors configured to execute the computer-executable instructions and cause the processing system to perform a method in accordance with any one of Clauses 1-36.

Clause 38: A processing system, comprising means for performing a method in accordance with any one of Clauses 1-36.

Clause 39: A non-transitory computer-readable medium comprising computer-executable instructions that, when executed by one or more processors of a processing system, cause the processing system to perform a method in accordance with any one of Clauses 1-36.

Clause 40: A computer program product embodied on a computer-readable storage medium comprising code for performing a method in accordance with any one of Clauses 1-36.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of enabling a UE to indicate its MIMO capability for SUL transmissions in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a first network entity, comprising:
    generating beam forming weights (BFWs) based on channel estimates (CEs) based on precoded demodulation reference signals (DMRS);
    performing a reversion procedure, on the BFWs, based on precoding applied at a user equipment (UE) when transmitting the precoded DMRS; and
    transmitting, on a fronthaul (FH), a signal to a second network entity with beamforming using the BFWs.

2. The method of claim 1, wherein performing the reversion procedure comprises applying an inverse operation that approximates a precoding matrix inversion to the CEs based on the precoded DMRS.

3. The method of claim 2, wherein the inverse operation involves at least one of regularization, preprocessing of the CEs, or post processing of an inversion outcome.

4. The method of claim 2, wherein, when the BFWs are generated based on CEs based on precoded DMRS, the first entity applies an inverse of a precoding matrix to a CE based on the precoded DMRS for a full-rank transmitted precoder matrix indicator (TPMI).

5. The method of claim 1, further comprising providing, to the second network entity:
    an indication of a first capability of the first network entity to generate BFWs based on DMRS-based CEs; and
    an indication of a second capability of the first network entity to perform the reversion procedure.

6. The method of claim 5, further comprising receiving, from the second network entity, an indication of whether or not the first network entity is to perform the reversion procedure.

7. The method of claim 1, wherein the precoding is based on a transmitted precoder matrix indicator (TPMI) that has a reduced rank.

8. The method of claim 7, wherein the reversion procedure comprises an approximate reversion procedure.

9. The method of claim 8, wherein the approximate reversion procedure is designed to ensure that a rank of channel observations are preserved, while projecting the DMRS-based CE to an un-precoded basis.

10. The method of claim 9, further comprising providing an indication, to the second network entity, of at least one of:
    whether the DMRS-based CE was projected to the un-precoded basis; or
    whether or not the reduced rank is representative of the un-precoded basis.

11. The method of claim 7, further comprising receiving, from the second network entity, an indication of whether the second network entity expects the first network entity to project port-reduced streams to an un-precoded basis.

12. The method of claim 11, wherein the indication indicates whether the first network entity should use specific precoding for the projection to the un-precoded basis.

13. The method of claim 11, wherein the un-precoded basis corresponds to the basis of ports sounded by sounding reference signals (SRS) to which the precoding was applied at the UE.

14. A method for wireless communication by a second network entity, comprising:
  receiving, from a first network entity, at least one of
    an indication of a first capability of the first network entity to generate beam forming weights (BFWs) based on precoded demodulation reference signals (DMRS)-based channel estimates (CEs); or
    an indication of a second capability of the first network entity to perform a reversion procedure, on the BFWs, based on precoding applied at a user equipment (UE) when transmitting the precoded DMRS; and
  performing a transmitted precoding matrix indicator (TPMI) selection procedure based on at least one of the indication of the first capability of the first network entity or the indication of the second capability of the first network entity.

15. The method of claim 14, wherein performing the TPMI selection procedure comprises performing a reversion procedure if the first network entity indicates it lacks the ability to perform the reversion procedure.

16. The method of claim 14, wherein the first network entity indicates the precoding is based on a transmission precoder matrix indicator that is reduced rank.

17. The method of claim 16, wherein the first network entity indicates the reversion procedure comprises an approximate reversion procedure.

18. The method of claim 17, wherein the approximate reversion procedure is designed to ensure that a rank of channel observations are preserved, while projecting the DMRS-based CE to an un-precoded basis.

19. The method of claim 18, further comprising receiving an indication, from the first network entity, of at least one of:
  whether the DMRS-based CE was projected to the un-precoded basis; or
  whether or not the reduced rank is representative of the un-precoded basis.

20. The method of claim 17, further comprising transmitting, to the first network entity, an indication at least one of:
  whether the second network entity expects the first network entity to project port-reduced streams to an un-precoded basis; or
  whether the first network entity should use specific TPMIs for the projection to the un-precoded basis.

* * * * *